No. 715,192. Patented Dec. 2, 1902.
L. C. AMBERSON.
NUT AND BOLT.
(Application filed June 25, 1901.)

(No Model.)

Witnesses:

Inventor
L. C. Amberson.
By
Attys.

UNITED STATES PATENT OFFICE.

LINTON C. AMBERSON, OF YOUNGSTOWN, OHIO.

NUT AND BOLT.

SPECIFICATION forming part of Letters Patent No. 715,192, dated December 2, 1902.

Application filed June 25, 1901. Serial No. 65,955. (No model.)

*To all whom it may concern:*

Be it known that I, LINTON C. AMBERSON, a citizen of the United States of America, residing at Youngstown, in the county of Mahoning and State of Ohio, have invented certain new and useful Improvements in Nuts and Bolts, of which the following is a specification, reference being had therein to the accompanying drawings.

This invention relates to certain new and useful improvements in nuts and bolts and relates more particularly to threadless nuts and bolts that are effectually locked together and prevent their turning.

The present invention has for its object to construct a nut and bolt of this character that will be extremely simple in construction and strong, durable, and comparatively inexpensive to manufacture; furthermore, one that will be highly efficient in its use.

The herein-described invention contemplates to construct a device of this character that may be easily placed in position and securely locked and one that has but few parts that are liable to become out of order or deranged; furthermore, to construct the device in such a manner that it will be impossible for the nut to become loosened by reason of jarring or the like.

The invention broadly consists in a bolt having two spiral grooves arranged therein, which spiral grooves are turned in the opposite direction upon the bolt and intersect one another; furthermore, to construct the nut of two parts, each having a projection or runner to ride in said spiral grooves.

The invention further consists in constructing the engaging faces of the nut so that they will interlock with one another to prevent turning of the nut after adjusted to position.

The invention finally consists in the novel combination and arrangement of parts to be hereinafter more fully described, and specifically pointed out in the claims.

In describing the invention in detail, reference is had to the accompanying drawings, forming a part of this specification, and wherein like numerals of reference indicate corresponding parts throughout the several views, in which—

Figure 1:
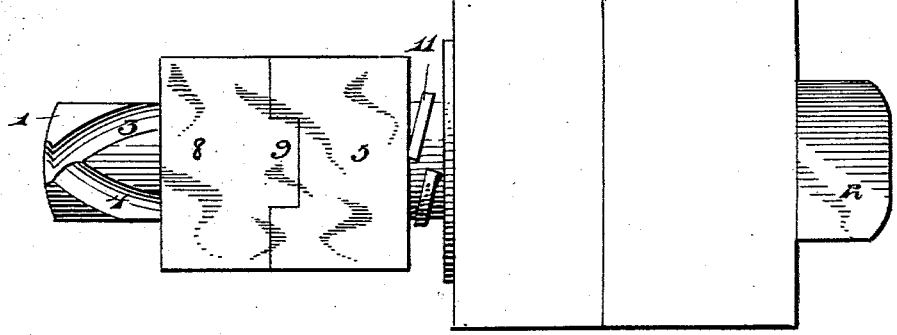
Figure 2:
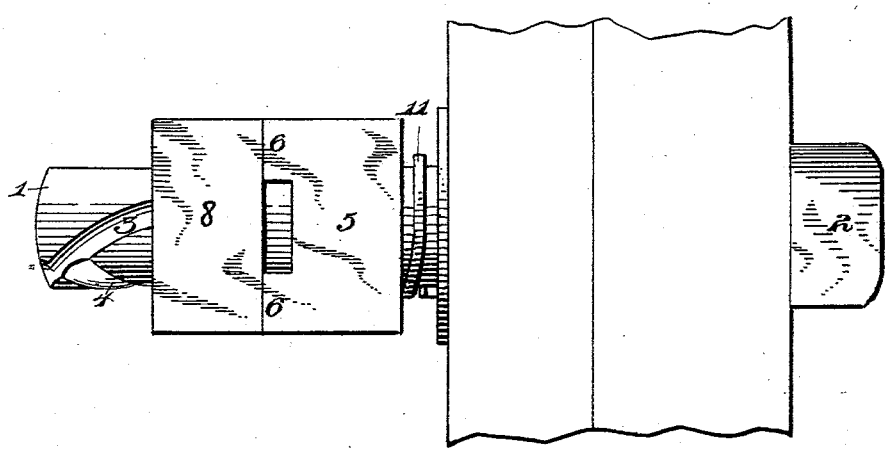
Figure 3:
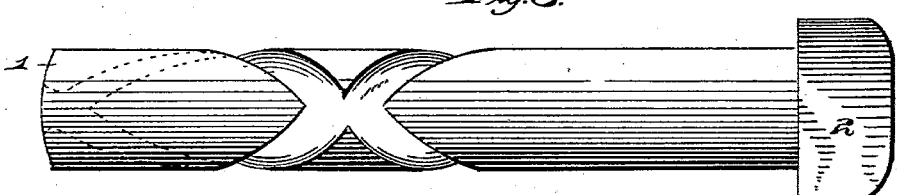
Figure 4:
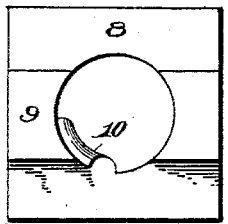
Figure 5:
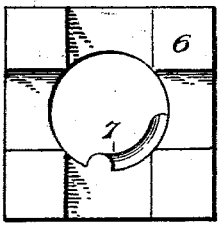

Figure 1 is a side elevation of my improved threadless nut and bolt. Fig. 2 is a top plan view thereof. Fig. 3 is a side elevation of the bolt. Fig. 4 is a side elevation of the engaging face of the outer section of the nut. Fig. 5 is a similar view of the nether section of the nut.

To put my invention into practice, I provide a bolt 1, having the ordinary head 2, the said bolt being provided on the outer portion of its shank with two intersecting spiral grooves 3 and 4, the former being a right-hand groove and the latter a left-hand groove. In connection with the bolt-grooves, as above described, I employ a nut, which is made in two sections 5 and 8. The section or half 5 of the nut I herein term the "inner" section, and it is provided on its engaging face with grooves extending across the same at right angles to each other, so as to form the four projections 6. This section of the nut is formed on the walls of its bolt-openings with a curved projection or runner 7, which engages in the right-hand spiral groove 3. The section or part 8 of the nut I herein term the "outer" section, and it is cut away along opposite edges of its engaging face, so as to form the projections 9, which are adapted to interlock with the projection 6 on the inner section of the nut in a manner as will be hereinafter more fully explained and in the manner as shown in Figs. 1 and 2 of the drawings. This outer section of the nut has a curved projection or runner 10 to operate in the left-hand spiral groove 4 of the bolt. The nuts are locked in position on the bolt by means of a spring-washer 11 or other yielding device, which is placed upon the bolt between the objects through which the bolt passes to the inner section of the nut. In the accompanying illustration I have shown this device as consisting of a split washer, the ends of which are bent outwardly from each other, so as to give a spring to the washer. This washer may have one or more convolutions, as will be readily apparent.

To place the nut in position on the bolt and lock the same, the inner section 5 is placed on the bolt with its runner in the groove 3, and the same may readily be turned to position against the spring-washer 11. The outer section 8 of the nut is then placed upon the bolt, with the runner 10 engaging in the spiral groove 4. This outer section may be readily turned into position until such time as the projections 9 of the outer section abut against the projections 6 of the inner section, at which time the two sections of the nut will be in abutting engagement with each other; but the projections thereof will not be interlocked. A wrench or other device is now applied to the inner section 5 of the nut, and this section is turned toward the left, compressing the spring 11 and moving the section 5 of the nut sufficiently far toward the washer so that the section 8 may be turned to the right by hand, so as to bring the projections 9 thereof into the recesses between the projections 6 of the section 5. The section 8, it will be observed, may readily be turned by hand, so as to effect this locking engagement during the time that the section 5 is being turned by the wrench, owing to the section 5 being turned to the left, so as to allow the projections 9 to enter between the projections on the section 5. As soon as the wrench-pressure on the section 5 is relieved the spring back of the section 5 forces the latter outwardly against the section 8, and the two sections being now interlocked together and under pressure both sections are securely locked by reason of their runners being in the right and left hand grooves of the bolt. To unlock the nut, the section 5 is turned toward the left in the same manner as to lock the nuts, and when so turned the spring is compressed sufficiently to allow the unscrewing of the section 8, which is turned toward the left.

Having fully described my invention, what I claim as new, and desire to secure by Letters Patent, is—

1. The combination with a bolt having spirally-arranged intersecting right and left hand grooves, said grooves having their inner and outer ends lying adjacent each other, of a nut made in two sections, the inner section having oppositely-disposed recesses in its outer face, and the outer section provided on its inner face with oppositely-disposed projections to engage in the recesses in the inner section, curved elongated runners in each nut-section extending but partially around the inner circumference thereof, and yielding means between the nut and the object through which the bolt is passed for holding the sections of the nut in locked engagement on the bolt, substantially as described.

2. The combination with a bolt having spirally-arranged right and left hand grooves, said grooves having their inner and outer ends lying adjacent each other and intersecting each other intermediate their ends, of a nut made in an inner and outer section, the inner section having recesses in its outer face, and the outer section having projections on its inner face to interlock in the recesses of the inner section, a runner in each nut-section extending but partially around the inner circumference thereof and disposed for engagement in the respective grooves, and a spring-washer for holding the nut-sections in locked engagement on the bolt, substantially as described.

3. The combination with a bolt having two spirally-arranged grooves, said grooves encircling the bolt in opposite directions and intersecting each other at a point intermediate their ends and merging at their outer ends in an enlarged single groove, of a nut formed in two sections adapted to interlock when in position on the bolt, each of the said sections formed in its bore with a single curved rib to engage in the grooves of the bolt, and a spring-washer for holding said nuts locked in the bolt, substantially as described.

4. The combination with a bolt having two intersecting spirally-arranged grooves, said grooves having their inner ends lying adjacent each other at a point adjacent the central portion of the bolt, and extending therefrom and encircling the bolt in opposite directions to each other and merging at their outer ends in an enlarged single groove arranged on the same side of the bolt as their upper ends, the said grooves intersecting each other on the opposite side of the bolt, of a nut composed of two sections engaging in the said grooves, and yielding means for holding the sections in locked engagement on the bolt.

In testimony whereof I affix my signature in the presence of two witnesses.

LINTON C. AMBERSON.

Witnesses:
JOHN NOLAND,
E. E. POTTER.